United States Patent [19]

Roselli

[11] 4,032,745

[45] June 28, 1977

[54] CONTROL SYSTEM FOR VEHICLE WINDOW HEATER

[75] Inventor: Sergio Roselli, Pisa, Italy

[73] Assignee: Saint-Gobain Industries, Neuilly-sur-Seine, France

[22] Filed: Apr. 17, 1975

[21] Appl. No.: 568,997

[30] Foreign Application Priority Data

Apr. 19, 1974 France .......................... 74.13650

[52] U.S. Cl. ................................. 219/203; 52/171; 219/491; 219/508; 219/509; 219/522; 340/235

[51] Int. Cl.[2] ...................... H05B 1/02; E06B 7/12

[58] Field of Search .......... 219/202, 203, 522, 543, 219/547, 508, 491, 509; 52/171; 340/234, 235; 317/DIG. 3

[56] References Cited

UNITED STATES PATENTS

| | | | |
|---|---|---|---|
| 3,696,360 | 10/1972 | Gajewski | 340/235 |
| 3,902,040 | 8/1975 | Ikeda et al. | 219/203 |
| 3,934,111 | 1/1976 | Roselli et al. | 219/203 |
| 3,968,342 | 7/1976 | Inaba | 219/203 |

FOREIGN PATENTS OR APPLICATIONS 1,321,221   6/1973   United Kingdom .............. 219/203

*Primary Examiner*—A. Bartis

[57] ABSTRACT

Apparatus for controllably heating a vehicle window having a heating grid is described including an oscillator and a signal detector, with a signal circuit coupling the oscillator and the signal detector having a DC voltage component at one or more points thereof. One or more humidity detectors are coupled to the signal circuit to control the amplitude of the oscillations supplied from the oscillator to the signal detector, advantageously by voltage divider action, and capacitor means provides DC isolation between the humidity detector(s) and any DC voltage component in the signal circuit, and also between humidity detectors when a plurality are used. Advantageously the humidity detector(s) are directly connected to the heating grid, and varying DC voltage levels at the point(s) of connection to the grid are isolated by the capacitor means. Particular arrangements of the humidity detectors on the window and connections to the heating grid are described.

7 Claims, 3 Drawing Figures

CONTROL SYSTEM FOR VEHICLE WINDOW HEATER

The present invention pertains to heated windows for vehicles such as the rear windows of automobiles, and to circuits for automatically controlling the operation thereof. Heating means are provided on such windows to defrost them and to prevent the accumulation of moisture thereon so as to avoid impairment of visibility for the driver of the vehicle.

It has been heretofore proposed to control automatically the operation of such heating devices by means of electronic circuits responsive to a humidity detector including one or more parallel-connected humidity sensitive devices. Such an automatic control has the advantage of convenience and also reduces current consumption since operation of the circuit is cut off automatically when it is no longer needed.

In practice, however, such automatic control has been afflicted with certain shortcomings. Various types of humidity detectors have been proposed including among others as assemblage of complementary electrodes disposed on the window itself with a smalll separation between two groups of those electrodes, the electrodes being at the edge of the region on the window intended to be cleared.

One mode of manufacture includes the simultaneous formation of the heating grid and of the humidity detector on the surface of the glass. The heating conductors and those which are to constitute the humidity detectors are laid down, by means of a silk screen process, as a pattern of strips in the form of a suspension of metallic particles and of a fusible glass frit. The pattern of conducting lines thus produced is baked to the window, for example in the heating of the glass which takes place prior to its bending to curved shape or prior to the tempering to which such glass is subjected in order to confer shatterproof properties on it. The conducting grid thus produced can be reinforced by electrolytic deposition of a layer of copper protected by a layer of nickel similarly deposited. Such reinforcement renders the grids more uniform in electrical properties and protects them against ageing and deterioration.

The two terminals of the humidity detecting elements may be independent of the heating grid. Alternatively, one of them may be connected to the heating grid, usually to the bus bar which is grounded to the vehicle body.

Especially when the deposit of silver particles is not protected by an insoluble nickel layer, the silver may be short-lived if it is subjected to adverse atmospheric conditions and if the current through the circuit is not suitably limited. Generally, the humidity detector on the glass can withstand currents of the order of 5 microamperes. There exist a large number of transistorized control circuits which amplify a signal generated by a variation in resistance, or more generally in impedance, and such circuits can be employed here, responsive to variations in the impedance of the humidity detecter for control of the application of electric power to the heater grid. Such amplifying and control circuits (hereinafter "control" circuits) may operate on either direct or on alternating current. When alternating current is employed, the control circuit generally includes an oscillator, a pre-amplifier, a detector and at least one power amplifier stage.

Variation in the resistance of the humidity detectors is observed, for the purpose of controlling the application of power to the heater grid, as a result of the application of a voltage difference between the electrodes of the humidity detector. When a direct current voltage is employed for this purpose, correct operation of the circuit is sometimes impaired, due to self-polarization of the negative electrode. Such self-polarization can occur through the formation thereon of an insulating layer comprising minute hydrogen bubbles.

It is accordingly an object of the invention to employ the humidity detector in a control circuit employing alternating current. The invention provides a simple circuit of this character which avoids all direct continuous current flow between the electrodes of the humidity detector even though the detector may have only one terminal electrically isolated from the heater grid.

In French Pat. No. 2,148,108 a humidity detector separate from the heating network is connected across the inductance of an oscillator to load the inductance as the humidity increases, and a capacitor is in series with the parallel combination of inductance and humidity detector. The present invention is quite different, as will be apparent from the following description.

In accordance with the invention, one or both terminals of each detector (if plural detectors are employed), are connected in series with an electrical capacitance so as completely to decouple the terminal or terminals from all direct current voltage, whether deriving from the circuit itself or from conditions on the glass in the vicinity of the humidity detector. One terminal of each humidity detector is preferably connected directly to an immediately adjacent portion of the heating grid, and the resistance or impedance between the two electrodes or sets of electrodes which make up the humidity detector is connected (via a capacitance in series with the other terminal of the detector) across one of the signal stages of the control circuit. More particularly, the humidity detector is inserted in the output of such a stage so as to constitute the variable resistance of a potentiometer through which signal is delivered to the next succeeding stage.

Advantageously, the signal of the oscillator is used to effect opening of a set of relay contacts which control the application of power to the heating grid. The humidity detector or detectors are connected at the output of that oscillator, across the input to the preamplifier and impedance matching network which follows it. The load impedance of the oscillator may thus include a fixed resistor and a capacitance in series therewith, and in addition one or more humidity detectors disposed at different locations on the window and having each one terminal connected to a distinct point in the heating grid. Even when these humidity detectors are connected in parallel to points theoretically of the same potential, it is desirable to decouple them from each other completely for direct current voltage, as above stated. The capacitance of the direct current isolating capacitors may be that of interstage capacitors, and each of the humidity detectors may be connected between two capacitors which serve to couple the two stages together for alternating current. Each detector may, alternatively, be connected in parallel between the two stages, feed for the preamplifier being provided upstream thereof. Mixed or modified constructions are also possible.

BRIEF DESCRIPTION OF THE DRAWINGS

The invention will now be further described in terms of two presently preferred exemplary embodiments and with reference to the accompanying drawings, in which.

DESCRIPTION OF PREFERRED EMBODIMENTS

Figure 1:
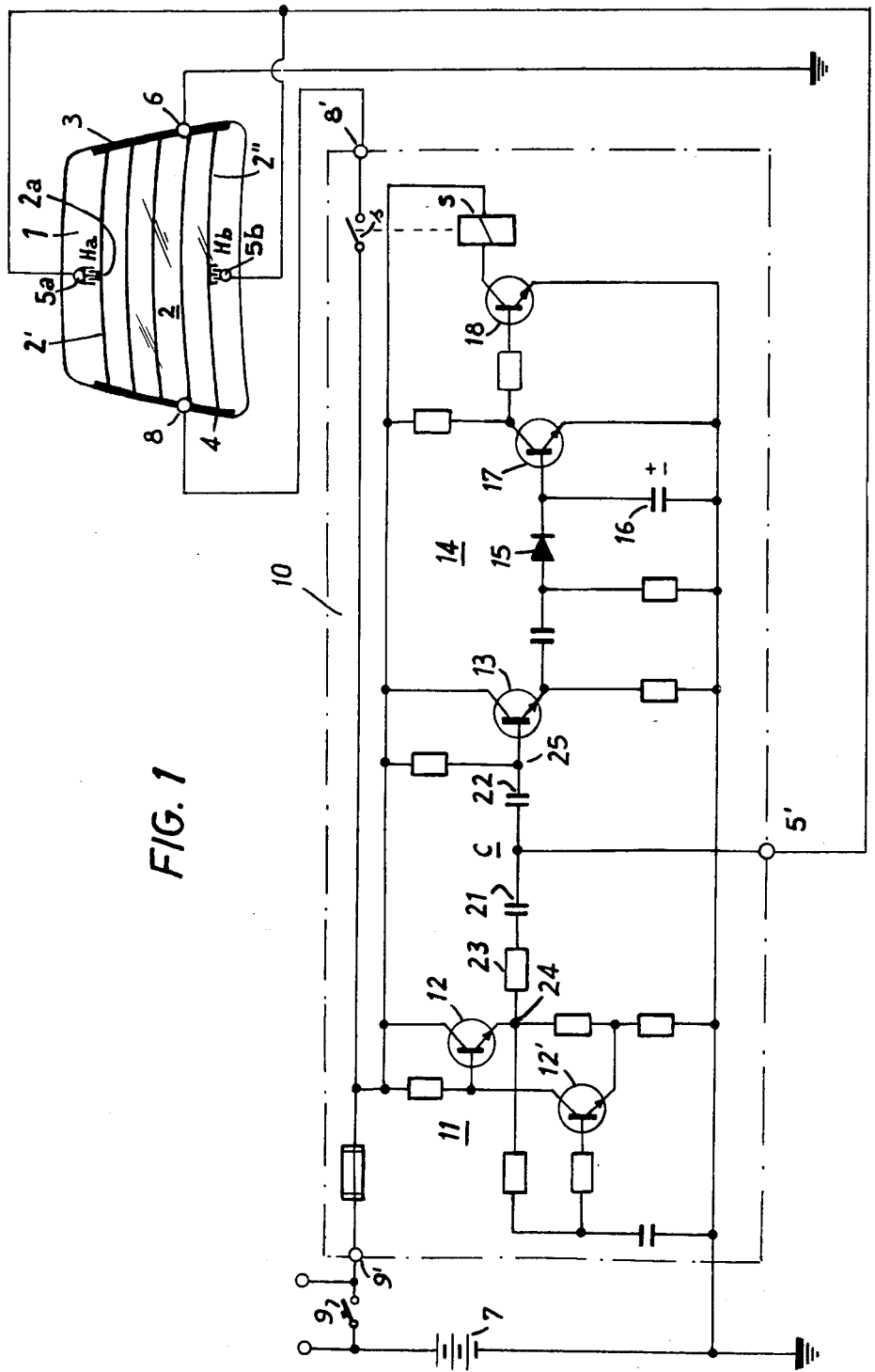
FIG. 1 is a schematic diagram of a circuit-heating grid and control circuit in accordance with the invention.
Figure 2:
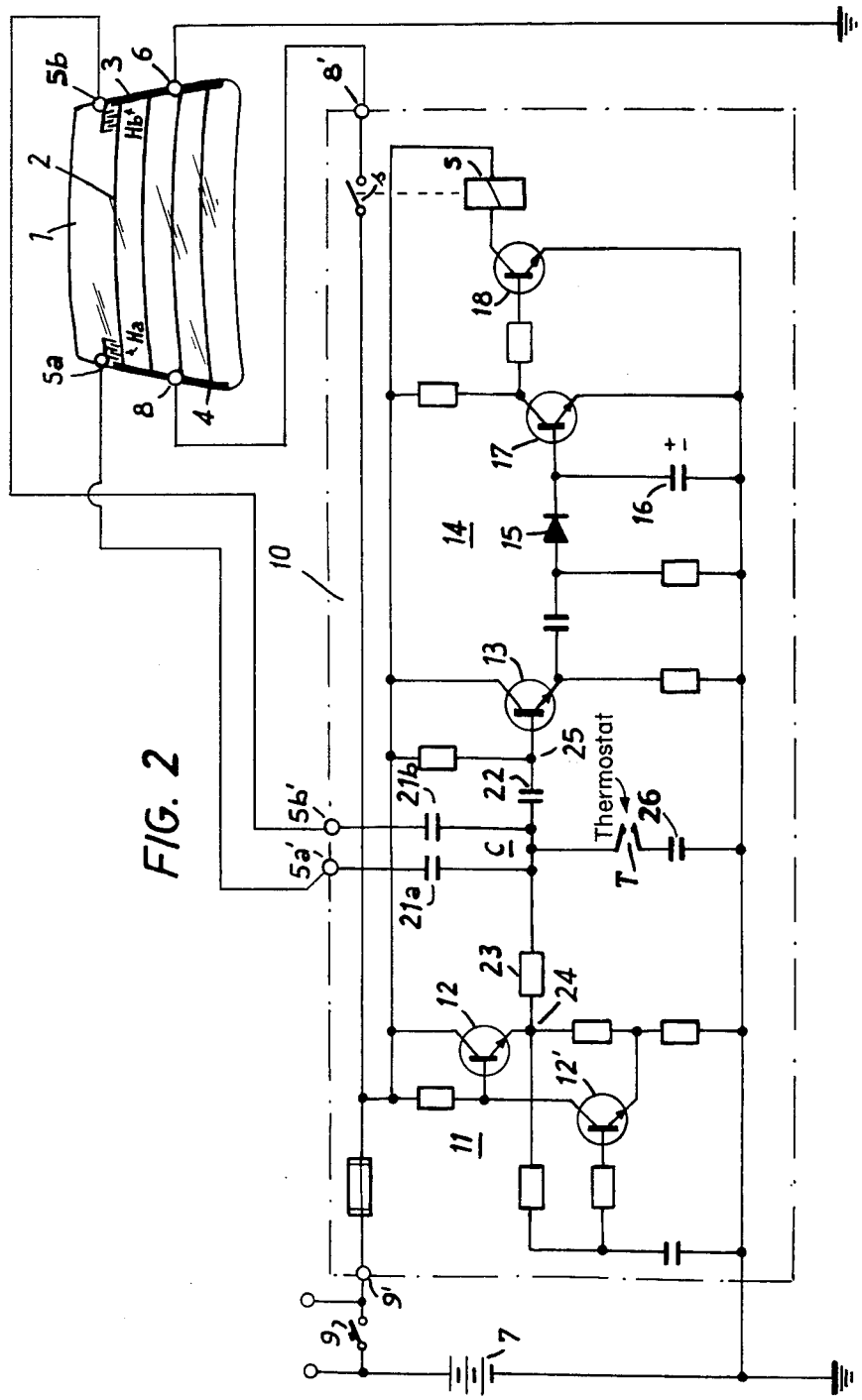
FIG. 2 is a schematic diagram illustrating another embodiment of the invention.

FIG. 1 shows diagrammatically a window 1 having a heating grid 2 formed on the inside surface thereof. The grid comprises a plurality of conducting strips 2' disposed substantially geometrically parallel to each other and connected electrically in parallel between two bus bars 3 and 4 at the sides of the window. The humidity detector Ha includes two sets of interdigitated conductors, shown at an enlarged scale in FIG. 3, of which one set is connected to the conducting strip 2', as shown, in the middle part (FIG. 1) or near the bus bar (FIG. 2). The other set of conductors has a separate terminal 5a. The whole is printed on the window by silk screen techniques and is baked in the window before the terminal 5a is applied, and before likewise there are applied the terminal 6 for the bus bar 3 and the terminal 8 for the bus bar 4. The terminal 6 is grounded and is thus connected to the negative terminal of the motorcar whose storage battery is indicated at 7. The terminal 8 for the bus bar 4 connects to a manually operable master switch 9 for control of the entire heating grid and control circuit therefor, via a terminal 8' and the contacts s of a relay S. The dot-dash box 10 identifies a chassis in which the control circuit is mounted.

Thus, in operation, the heating grid comprising the conductors 2' and 2" is energized from the vehicle battery, for example at 12 volts.

The control circuit includes a multivibrator 11 having transistors 12 and 12', and a pre-amplifier stage 13 whose transistor performs in addition an impedance matching function. It further includes a detector stage 14 having a diode 15 and a capacitor 16. It also comprises a direct current amplifier 17 and a power output stage including a transistor 18 connected in the circuit of the actuating coil of the relay S.

The multivibrator 11 may advantageously have a repetition rate between 0.1 and 2 kilohertz. The multibrator and the pre-amplifier 13 are AC coupled together by means of capacitors 21 and 22 at the output of the load resistance 23. The terminal 5a of the humidity detector Ha is connected to the input terminal 5' which connects between the capacitors 21 and 22 so as to be in series with a capacitance which isolates the DC voltage component at the output 24 from the multivibrator and also the DC component present at the input 25 to the preamplifier 13. On the other hand, the humidity detector (i.e. variable resistance on window 1) constitutes with the resistor 23 a voltage divider for the AC signal produced by the multivibrator. The voltage delivered through the capacitor 22 to the base of the transistor 13 thus varies inversely with the conductivity of the humidity detector Ha.

When moisture does not cover the surface of the glass between the two sets of conductors in the humidity detector, so that the detector Ha has a high impedance, say of the order of 1 megohm, the alternating current component delivered by the multivibrator is amplified by the preamplifier 13, is detected in stage 14, and causes the transistor 17 to conduct. Under these conditions, the transistor 18 is cut off, the relay S is not energized, and the heating circuit 2 on the window is not energized either.

When moisture covers the surface of the window between the conductors of the detector Ha, the resistance there may fall to a value of the order of 100,000 ohms and the alternating current rectified by the diode 15 is insufficient to cause the transistor 17 to conduct. Under these circumstances, transistor 18 does conduct and energizes the relay S, thus producing closing of the normally open relay contact s so as to energize the heating circuit 2 on the window.

It is possible to introduce a feedback between the transistors 17 and 18 so as to prevent the relay from chattering when it shifts between energized and deenergized states.

Detector Ha is connected directly to the heating strip 2'. The upper portion thereof may function as a gutter. It is disposed on the window far enough from the edge thereof so as not to be in danger of being grounded to the surrounding metal frame of the window.

Figure 3:
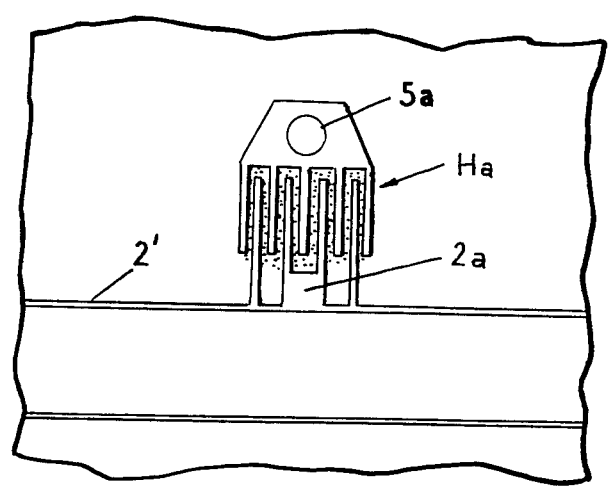
FIG. 3 shows an enlarged detail of a humidity detector.

It is possible to add on the window, as in FIG. 1, a second humidity detector Hb, the two being advantageously disposed one above the other on the center line of the window and on vertically spaced horizontally extending heating strips such as those indicated at 2' and 2" in the figure. Humidity detector Ha may be arranged as shown in FIG. 3. Each humidity detector may be formed of interdigitated combs, one of which is formed directly on the resistive conductor or strip with the strip locally broadened at the comb, as shown at 2a, thus allowing to put a terminal on this broadened place during the electrolytic deposition. This way, the same thickness of the metallic coating is obtained on the comb as on strip 2'. Humidity detector Hb may be similar but upside down on heating strip 2".

The combined operation of the two detectors makes it possible to eliminate the effect of air currents in the vehicle resulting in unequal deposits of humidity and/or frost on various portions of the window. While these air currents tend to evaporate condensed humidity from the window, they do not operate uniformly over the entire window surface. It is possible to connect the terminal 5b of the detector Hb directly to the terminal 5' as shown, although it is preferable to decouple the two humidity detectors, for example in the maner shown in FIG. 2, so as to guard against any undesirable dissymmetry of the heating grid.

FIG. 2 shows a circuit similar to that of FIG. 1 wherein similar reference characters identify corresponding elements of structure. The humidity detecting structure comprises separate detecting elements Ha and Hb disposed at the edges of the window. One terminal of the detector Ha is connected to the bus bar 4 and hence to the terminal 8, whereas the other terminal thereof is identified at 5a. In the detector Hb one terminal is connected to the bus bar 3 and thereby to the negative (grounded) battery terminal 6 and the other terminal is separately indicated at 5b. Terminals 5a and 5b connect to terminals 5a' and 5b' of the control circuit. The circuit includes a supplementary thermally responsive element such as a bimetallic strip switch 26 which short circuits the humidity detection elements when the temperature within the vehicle is at very low levels. The detectors Ha and Hb are separately decoupled by capacitors 21a and 21b and are, therefore, DC isolated. This isolates the humidity detectors from direct current voltages in the control circuit and, inasmuch as the detectors Ha and Hb are connected to two different points in the heating circuit, isolates the control circuit from DC voltages of the humidity detectors. Interstage coupling of the stages 11 and 13 is effected by means of a capacitor 22 at the outlet of a resistance 23. The thermostat switch T is likewise advantageously isolated from ground by a capacitor 26.

The mode of operation of the circuit of FIG. 2 is the same as that above described with respect to FIG. 1 except that energization of the heating circuit results from increased conductivity of either or both of the detectors Ha and Hb, or from closing of the bimetal switch T, so long as the manual switch 9 is closed. The switch T is set to produce such energization whenever the temperature inside the vehicle is low enough as to entail a risk of frost either on the inside surface, i.e., between the conductive elements of the detectors Ha and Hb, or of frost on the exterior.

From the foregoing it will be understood that a signal circuit including transistor 13 couples the output of oscillator 11 to the input of signal detector 14. The signal circuit has a DC voltage component at one or more points thereof, for example, at points 24 and 25. Coupling means is provided which AC couples one or more humidity detectors Ha, Hb to the signal circuit to control the amplitude of the oscillations supplied from the oscillator to the signal detector, and the coupling means includes capacitor means for providing DC isolation between the humidity detectors and any DC voltage component in the signal circuit. The DC isolation prevents any DC voltage in the signal circuit from affecting the humidity detector(s) and any DC voltage at the humidity detector(s) from affecting the signal circuit. In FIG. 1 the coupling means includes a pair of capacitors 21, 22 connected in series in the signal circuit and each humidity detector is connected to the common point between the capacitors. In FIG. 2 the capacitors 21a, 21b are in series wth respective humidity detectors, so that the humidity detectors are DC isolated from DC voltage components in the signal circuit and also from each other. As specifically shown, each humidity detector in FIG. 1 is directly connected to the heating grid at a point which is at different DC voltage levels when the switch S is opened and closed, respectively, and the pair of humidity detectors are connected to different points of the heating grid which have different DC voltage levels when the grid is energized. In FIG. 2 one electrode of humidity detector $H_a$ is directly connected to bus 4, which is at different DC voltage levels when switch 5 is opened and closed. The DC isolation insures proper operation of the control circuit despite these different DC voltage levels.

I claim:

1. Apparatus for heating a vehicle window comprising a heating grid for said window, a switch for connection of said grid to a source of electrical energy, an oscillator and a signal detector, a signal circuit for coupling the output of said oscillator to the input of said signal detector, said signal circuit having a DC voltage component at at least one point thereof, a humidity detector having a pair of spaced apart conductors disposed on the window, one of said conductors being connected directly to a point of said heating grid which is at different DC voltages when said switch is opened and closed respectively, coupling means for AC coupling the other conductor of said pair to said signal circuit to control the amplitude of oscillations supplied from said oscillator to said signal detector in response to variation of the impedance between said conductors, said coupling means including capacitor means for providing DC isolation between said humidity detector and any DC voltage component in said signal circuit, and means responsive to the output of said signal detector for actuating said switch.

2. Apparatus according to claim 1 in which said coupling means includes a pair of capacitors connected in series in said signal circuit between said oscillator and said signal detector and a connection from said other conductor of said humidity detector to the common point between said pair of capacitors.

3. Apparatus according to claim 1 in which said coupling means includes a series capacitor connected between said humidity detector and said signal circuit.

4. Apparatus according to claim 1 in which said signal circuit includes a pre-amplifier connected between said oscillator and said signal detector and a resistor connected in the output circuit of the oscillator, said coupling means connecting said humidity detector in series with said resistor to form a voltage divider between the output of the oscillator and the input of the pre-amplifier.

5. Apparatus according to claim 1 including a thermostatic switch connected in AC parallel with said humidity detector and DC isolated therefrom.

6. Apparatus according to claim 1 including a plurality of humidity detectors, said coupling means AC coupling said humidity detectors to said signal circuit with DC isolation between the humidity detectors and between the humidity detectors and any DC voltage component in said signal circuit.

7. Apparatus according to claim 6 in which said plurality of humidity detectors are connected between different points of said heating grid having different DC voltage levels when the grid is energized, and said signal circuit.

* * * * *